United States Patent
Hossain et al.

(10) Patent No.: US 11,747,919 B1
(45) Date of Patent: Sep. 5, 2023

(54) MULTI-INPUT FOR ROTATING AND TRANSLATING CROWN MODULES

(71) Applicant: Apple Inc., Cupertino, CA (US)

(72) Inventors: Muhammad F. Hossain, Sunnyvale, CA (US); Samuel A. Resnick, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/650,054

(22) Filed: Feb. 4, 2022

Related U.S. Application Data

(60) Provisional application No. 63/188,979, filed on May 14, 2021.

(51) Int. Cl.
*G06F 3/0362* (2013.01)
*G06F 3/01* (2006.01)
*G06F 3/0354* (2013.01)

(52) U.S. Cl.
CPC ............ *G06F 3/0362* (2013.01); *G06F 3/013* (2013.01); *G06F 3/03547* (2013.01)

(58) Field of Classification Search
CPC ..... G06F 3/0362; G06F 3/013; G06F 3/03547
See application file for complete search history.

(56) References Cited

U.S. PATENT DOCUMENTS

| | | | | |
|---|---|---|---|---|
| 2,288,215 A * | 6/1942 | Taubert | .................. | G04B 3/046 968/34 |
| 3,040,514 A * | 6/1962 | Dinstman | .............. | G04B 37/10 968/339 |
| 4,131,033 A * | 12/1978 | Wright | ..................... | G05G 1/02 74/504 |
| 5,508,978 A * | 4/1996 | Kalbermatter | .......... | H04M 1/26 379/433.1 |
| 5,867,082 A * | 2/1999 | Van Zeeland | ............ | G01D 5/06 200/521 |
| 8,570,273 B1 * | 10/2013 | Smith | .................. | G06F 3/03547 345/161 |
| 8,878,657 B2 * | 11/2014 | Periquet | .................... | G05G 1/08 340/407.1 |
| 8,922,399 B2 * | 12/2014 | Bajaj | ....................... | G06F 3/016 702/41 |
| 8,941,585 B2 * | 1/2015 | Minamitani | ........ | G06F 3/03547 345/184 |
| 9,009,626 B2 * | 4/2015 | Tsuk | ...................... | G06F 3/0362 715/830 |
| 9,028,134 B2 * | 5/2015 | Koshoji | ............... | G04B 37/106 368/290 |
| 9,105,413 B2 * | 8/2015 | Hiranuma | ................ | H01H 9/20 |
| 9,123,483 B2 * | 9/2015 | Ferri | .................... | G04B 37/106 |
| 9,244,438 B2 * | 1/2016 | Hoover | .................. | G04B 27/02 |
| 9,437,357 B2 * | 9/2016 | Furuki | ................... | H03K 17/97 |

(Continued)

*Primary Examiner* — Benyam Ketema
(74) *Attorney, Agent, or Firm* — DORSEY & WHITNEY LLP

(57) ABSTRACT

A wearable device includes a housing and a display carried by the housing, a capacitive sensor carried by the housing and including a movable outer surface. The capacitive sensor can include a first set of conductors forming a first electrical path, a second set of conductors forming a second electrical path, and a set of non-conductive insulators isolating the first set of conductors from the second set of conductors. A processor can also be carried by the housing and can be in communication with the display and the capacitive sensor.

19 Claims, 11 Drawing Sheets

(56) References Cited

U.S. PATENT DOCUMENTS

| | | | |
|---|---|---|---|
| 9,632,318 B2* | 4/2017 | Goto | G02B 27/017 |
| 9,800,717 B2* | 10/2017 | Ma | H04M 1/72454 |
| 9,946,297 B2* | 4/2018 | Nazzaro | G04G 21/02 |
| 10,061,399 B2* | 8/2018 | Bushnell | G06F 3/0338 |
| 10,234,828 B2* | 3/2019 | Ely | G06F 3/0362 |
| 10,379,629 B2 | 8/2019 | Bushnell et al. | |
| 10,599,101 B2* | 3/2020 | Rothkopf | G06F 3/015 |
| 10,642,467 B2* | 5/2020 | Merminod | H03K 17/96 |
| 10,964,422 B2* | 3/2021 | Desnerck | A61B 5/1118 |
| 11,162,579 B2* | 11/2021 | Park | F16H 59/08 |
| 11,181,863 B2* | 11/2021 | Ely | G04G 21/08 |
| 11,194,298 B2* | 12/2021 | Roach | G04G 21/025 |
| 11,360,440 B2* | 6/2022 | Perkins | G01D 5/3473 |
| 11,387,058 B2* | 7/2022 | Hwang | H01H 25/008 |
| 11,422,692 B2* | 8/2022 | Kamath | G06F 3/0484 |
| 2001/0004337 A1* | 6/2001 | Paratte | G04C 10/00 368/203 |
| 2004/0060807 A1* | 4/2004 | Nishimoto | H01H 25/041 200/553 |
| 2005/0259077 A1* | 11/2005 | Adams | G06F 3/0362 345/163 |
| 2007/0279401 A1* | 12/2007 | Ramstein | G06F 3/016 345/184 |
| 2008/0055241 A1* | 3/2008 | Goldenberg | G06F 3/04812 345/156 |
| 2008/0238879 A1* | 10/2008 | Jaeger | G06F 3/0338 345/173 |
| 2010/0271342 A1* | 10/2010 | Nagashima | G06F 3/0362 345/184 |
| 2011/0242064 A1* | 10/2011 | Ono | G06F 3/0362 345/184 |
| 2012/0055763 A1* | 3/2012 | Chou | H01H 25/065 200/4 |
| 2012/0186951 A1* | 7/2012 | Wu | H01H 25/008 200/4 |
| 2013/0220779 A1* | 8/2013 | Kerner | H01H 25/06 200/4 |
| 2013/0342222 A1* | 12/2013 | Yokoyama | G01D 5/2415 324/662 |
| 2014/0062841 A1* | 3/2014 | Ishikawa | G06F 3/0338 345/8 |
| 2014/0204062 A1* | 7/2014 | Goto | G02B 27/0176 345/184 |
| 2015/0002465 A1* | 1/2015 | Tsukahara | H04N 5/7491 345/174 |
| 2015/0041289 A1* | 2/2015 | Ely | H01H 25/06 200/4 |
| 2015/0185757 A1* | 7/2015 | Jantke | G05G 9/04796 74/471 XY |
| 2015/0341031 A1* | 11/2015 | Marquas | H01G 5/0136 200/600 |
| 2015/0350413 A1* | 12/2015 | Ma | H04M 1/72463 455/418 |
| 2016/0020045 A1* | 1/2016 | McAllister | G05G 5/03 200/336 |
| 2016/0036966 A1* | 2/2016 | Ka | G06F 1/169 455/566 |
| 2016/0041048 A1* | 2/2016 | Blum | G06F 3/012 73/774 |
| 2016/0058375 A1* | 3/2016 | Rothkopf | G04G 21/025 600/323 |
| 2016/0061636 A1* | 3/2016 | Gowreesunker | G01D 5/34715 250/201.1 |
| 2016/0098016 A1* | 4/2016 | Ely | G04G 21/00 368/308 |
| 2016/0116306 A1* | 4/2016 | Ferri | G04C 3/001 250/231.14 |
| 2016/0313703 A1* | 10/2016 | Ely | G04B 3/046 |
| 2016/0320583 A1* | 11/2016 | Hall, Jr. | G06F 1/163 |
| 2016/0327911 A1* | 11/2016 | Eim | G04B 37/1486 |
| 2016/0378187 A1* | 12/2016 | Moussette | G06F 3/0202 345/184 |
| 2017/0090572 A1* | 3/2017 | Holenarsipur | G06F 3/0362 |
| 2017/0090599 A1* | 3/2017 | Kuboyama | H03K 17/962 |
| 2017/0104902 A1* | 4/2017 | Kim | G02B 7/1822 |
| 2017/0139489 A1* | 5/2017 | Chen | G06F 3/0312 |
| 2017/0269715 A1* | 9/2017 | Kim | G06F 3/0485 |
| 2018/0225701 A1* | 8/2018 | Han | G06Q 30/0238 |
| 2019/0012003 A1* | 1/2019 | Grant | G06F 3/0312 |
| 2019/0391539 A1* | 12/2019 | Perkins | G04C 3/008 |
| 2020/0064774 A1* | 2/2020 | Ely | G04C 3/002 |
| 2020/0064779 A1* | 2/2020 | Pandya | G04C 3/002 |
| 2020/0073339 A1* | 3/2020 | Roach | G04G 17/08 |
| 2020/0122575 A1* | 4/2020 | Chion | B60K 35/00 |
| 2020/0324613 A1* | 10/2020 | Dalia | B60H 1/00742 |
| 2021/0255590 A1* | 8/2021 | Ely | G04G 21/00 |

\* cited by examiner ns and the system can further include a pivot detection sensor disposed adjacent to the stem. In yet another example, the system can further include a gaze camera disposed adjacent to the display.
MULTI-INPUT FOR ROTATING AND TRANSLATING CROWN MODULES

CROSS-REFERENCE TO RELATED APPLICATIONS

This application claims the benefit of U.S. Provisional Patent Application No. 63/188,979, filed May 14, 2021, entitled "MULTI-INPUT FOR ROTATING AND TRANSLATING CROWN MODULES", the disclosure of which is incorporated herein by reference in its entirety.

FIELD

The described embodiments relate generally to an input device. More particularly, the present embodiments relate to a movable input device capable of detecting multiple forms of input.

BACKGROUND

Electronic devices are continually increasing in their functionality and capabilities. Accordingly, there is a need for input mechanisms that can operate with the increased performance of these devices. Electronic devices include a variety of input members for receiving input from users. Examples of input members include keyboards, touch screens, displays, joysticks, microphones, speakers, crowns, trackpads, track balls, and so on.

Some input devices include a moveable member and one or more sensors to detect touch or other user inputs. Further, certain input devices can be adapted or configured to suit particular electronic devices, such as smartphones, smart watches, head-mounted displays (HMDs), etc.

SUMMARY

According to some aspects of the present disclosure, a head-mounted display includes a housing, a display attached to the housing, and a tactile input disposed on the head-mounted display, the tactile input including a movable touch-sensitive region.

In some examples, the touch sensitive region includes a first electrical path, and a second electrical path, isolated from the first electrical path. Additionally, in some examples, the tactile input can include a cap configured to rotate and translate relative to the housing, the touch-sensitive region positioned on the cap, a stem extending from the cap through an opening defined by the housing, the stem at least partially defining the first electrical path and the second electrical path, and a non-conductive material positioned between the first electrical path and the second electrical path.

In some examples, a first end of the stem can be attached to the cap, and a second, opposite end of the stem can be attached to a component within the housing. Further, in some examples, the movable touch-sensitive region can include a first electrode electrically connected to the first electrical path, and a second electrode, electrically isolated from the first electrode and electrically connected to the second electrical path. A processor can be electrically connected to the first electrical path and the second electrical path, wherein the processor can receive a first finger detection signal from the first electrode via the first electrical path, receive a second finger detection signal from the second electrode via the second electrical path, and determine a translation of a finger across the touch-sensitive region based at least in part on the first finger detection signal and the second finger detection signal. In some examples, the processor can modify an output of the display in response to the determined translation.

In some examples, the head-mounted display can further include a proximity camera disposed on the housing and directed to the moveable touch-sensitive region. The display can present a visual indicator based on a location of a user's finger relative to the touch-sensitive region detected by the proximity camera.

In another example embodiment of the head mounted display, the stem defines an axis and the cap can be rotatable about the axis and translatable in a direction that is substantially parallel to the axis. According to this example, the axis can be pivotable relative to the housing, and the system can further include a pivot detection sensor disposed adjacent to the stem. In yet another example, the system can further include a gaze camera disposed adjacent to the display.

According to some aspects, a capacitive input member includes a crown defining an outer region electrically connected to a first electrical path, and an inner region electrically connected to a second electrical path, the inner region electrically isolated from the outer region. According to this example, the first electrode can be electrically connected to the first electrical path, a second electrode can be electrically isolated from the first electrode and electrically connected to the second electrical path, a shaft can be physically and electrically connected with the crown, and a signal output sensor can be electromagnetically connected to the shaft. In this example, the shaft can be configured to transfer electrical and physical inputs from the crown to the signal output sensor.

In some examples, the outer region of the crown is translatable relative to the inner region. In some examples, the shaft of the capacitive input member defines an axis, and the crown is rotatable about the axis and translatable in a direction that is substantially parallel to the axis. In some examples of the capacitive input member, the axis can be pivotable relative to the signal output sensor. Additionally, the capacitive input member can include an array of perimeter electrodes disposed on a perimeter of the outer region.

According to some aspects, a wearable device can include a housing, a display carried by the housing, a processor disposed in the housing and electrically connected to the display, and a capacitive sensor carried by the housing and electrically connected to the processor. In this example, the capacitive sensor can include a movable outer surface, a first conductive path extending from the movable outer surface, a second conductive path extending from the movable outer surface, and a non-conductive insulator electrically isolating the first conductive path from the second conductive path.

In some examples, the wearable device can further include a first electrode disposed on the movable outer surface and electrically connected to the first conductive path, and a second electrode disposed on the movable outer surface electrically isolated from the first electrode, and electrically connected to the second conductive path, wherein the processor receives a first finger detection signal from the first electrode via the first electrical path, receives a second finger detection signal from the second electrode via the second electrical path, and determines a translation of a finger across the touch-sensitive region based at least in part on the first finger detection signal and the second finger detection signal.

In other examples of the wearable device, the processor modifies an output of the display in response to the determined translation. The wearable device can further include a proximity sensor connected to the housing, the proximity sensor being configured to detect a proximity of a user's hand relative to the capacitive sensor. In some examples, the proximity sensor can include a camera.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

The following disclosure relates to an input device that includes a moveable member and a touch-sensitive interface. The moveable member can be manipulated in a variety of directions. In some examples, the movement includes translation in one or more directions, rotation, tilt, and so on. Moving the moveable member can be used to generate a predetermined input signal corresponding to the motion. The input device can define a touch-sensitive interface having multiple electrical paths capable of transmitting signals through the input device. For example, a touch by a user on one or more of the electrical paths can be used to generate a predetermined input signal corresponding to the received touch input. Further, a sequence of touches along predetermined electrical paths can correspond to specific touch-gesture inputs resulting in predetermined commands. In a particular example, the input device can be a crown positioned on a head-mounted display/smart glasses (HMD).

The following disclosure provides particular benefits in the field of HMDs. Specifically, the input device provides additional utility without adding a separate remote control, thereby reducing complexity of the system. An input device positioned on an HMD can enhance the user's experience by providing an intuitive interface between the HMD and the user's hand. Further, the ability to detect presence and directional input, coupled with additional input technologies, such as eye tracking, enhances the user's experience and adds functionality and control to the user interface of the HMD.

These and other embodiments are discussed below with reference to FIGS. 1-8B However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
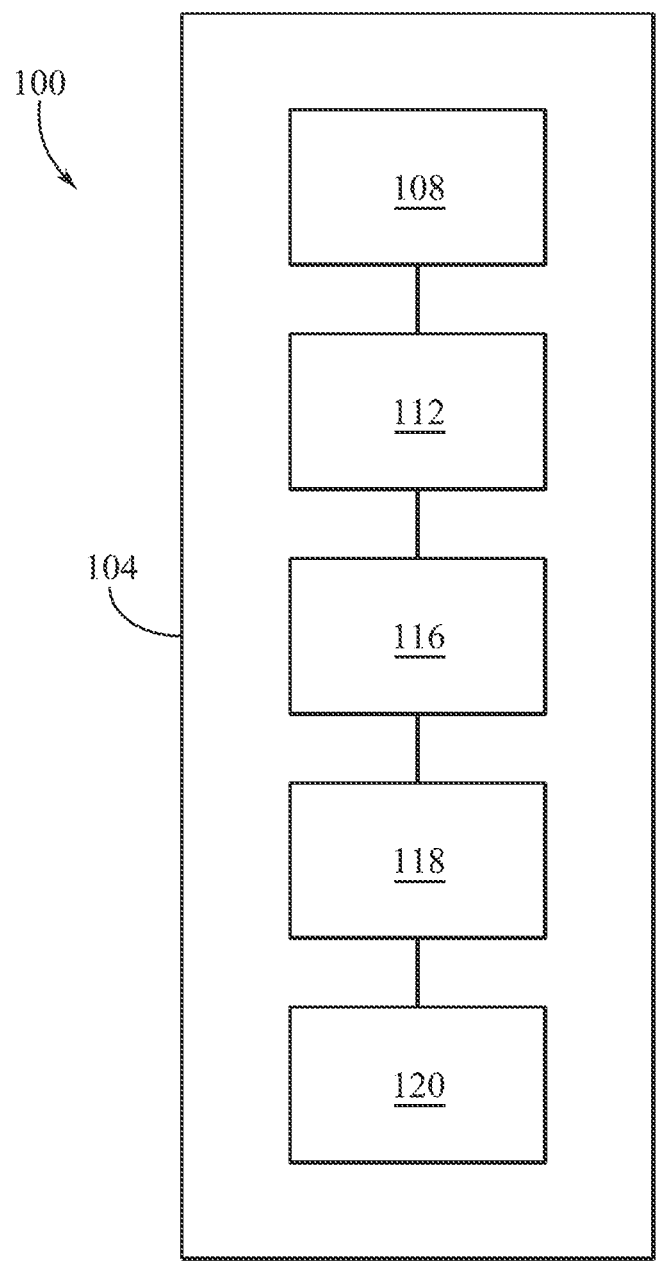
FIG. 1 shows a block diagram of an electronic device.

FIG. 1 illustrates a block diagram of an electronic device 100. The electronic device 100 can include a housing 104, a human interface unit 108, a sensor unit 112, a processor 116, a battery 118, and an input member, tactile input, or input device 120. The housing 104 can be a physical structure that incorporates, contains, or connects to the battery 118, the processor 116, the sensor unit 112, the input device 120, and the human interface unit 108. In some examples, one or more of the battery 118, the processor 116, the sensor unit 112, the input device 120, or the human interface unit 108 can be omitted. Although FIG. 1 shows the housing 104 as a single unit, multiple operatively connected housing units can be used.

In some embodiments, the electronic device 100 can include one of a variety of portable electronic devices or portable computing devices. Examples include cell phones, smart phones, tablet computers, laptop computers, timekeeping devices, head-mounted displays, computerized glasses and other wearable devices navigation devices, sports devices, accessory devices, health-monitoring devices, medical devices, and the like. As discussed below, the depicted components of the electronic device 100 improve the user experience by providing additional functionality and control of the applications executed on or by the electronic device.

The processor 116 can receive data, such as from a data storage unit, the sensor unit 112, the input device 120, the human interface unit 108, or a combination thereof. The processor 116 can perform or execute computer program instructions based on received data. For example, the processor 116 can receive and execute the computer program instructions stored on a data storage unit in response to receiving input at the input device 120. The processor 116 is operable to receive/output data. For example, the processor 116 can receive/output data from/to the sensor unit 112, the battery 118, the input device 120, and the human interface unit 108. The processor 116 can control the battery 118, the sensor unit 112, the input device 120, and the human interface unit 108.

The sensor unit 112 can detect or determine one or more aspects of the operational environment or physical environment of the electronic device 100. Although only one sensor unit 112 is shown in FIG. 1, it will be understood that sensor unit 112 can include multiple physically distinct or combined sensors. For example, the sensor unit 112 can include one or more of a camera, a microphone, an infrared receiver, a global positioning system unit, a gyroscopic sensor, an accelerometer, a pressure sensor, a capacitive sensor, a biometric sensor, a magnetometer, a radar unit, a LIDAR unit, an ultrasound unit, a temperature sensor, or any other sensor capable of detecting or determining one or more aspects or conditions of the operational environment of the electronic device 100.

The sensor unit 112 can be operatively coupled to the input device 120. In some examples, the sensor unit 112 can include one or more proximity sensors capable of detecting a proximity of a user. In some examples, the proximity sensor can detect a proximity of a user's hand and/or finger relative to the electronic device 100, or relative to a portion of the electronic device. The proximity sensor can be used to determine that the user's hand is approaching the input device 120. The proximity sensor can include at least one of a camera, a laser, ultrasonic transducer, or any other sensor capable of detecting a proximity of a user.

The input device 120 can be accessible to a user and can receive user input. The input device 120 can be a tactile input that is engaged, modified, selected, or actuated by touch, either via mechanical manipulation, and/or capacitive detection. As discussed in greater detail below, the input device 120 can include a moveable member or element and a touch-sensitive interface. The moveable member can be manipulated in a variety of directions corresponding to various input commands. For example, the movements can include translation in one or more directions, rotation, tilt, combinations thereof, and so on. The input device 120 can define a touch-sensitive interface having multiple electrical paths capable of transmitting signals through the input device. For example, a touch by a user on one or more of the electrical paths can be used to generate a predetermined input signal corresponding to the received touch input. Further, a sequence of touches along predetermined electrical paths can correspond to certain touch-gesture inputs. In some examples, input received by the input device 120 can results in visual data output to the user through the human interface unit 108. In some examples, the input device 120 can include a biometric sensor. In a particular example, the input device 120 can be a crown input mechanism positioned on a head-mounted display (HMD). The input device 120 can include or be paired with a light-based user input receiver, such as a camera, optical encoder, or infrared receiver, a sound-based receiver, such as a microphone, a mechanical receiver, such as a button, joystick, dial, or slider, a switch, a motion-based input, a touch-based input, or a combination thereof. Although FIG. 1 shows the input device 120 as a single unit, multiple input devices can be used.

The human interface unit 108, or user interface, can output, present, or display data to a user of the electronic device 100, such as data received from the battery 118, the processor 116, the sensor unit 112, the input device 120, and/or the charging station 210. For example, the human interface unit 108 can include a light-based display, a sound-based display, a haptic feedback system, a motion-based display, or a combination thereof.

The human interface unit 108 can receive user input and communicate user input data representing the user input to the battery 118, the processor 116, the sensor unit 112, the input device 120, or a combination thereof. In some examples, the human interface unit 108 can receive one or more signals from the sensor unit 112 and/or the input device 120, and can display a representative image of the received signals.

It will be understood that the electronic device 100 can include other components not shown in FIG. 1. Further details regarding electronic devices are provided below with reference to FIGS. 2A and 2B.

Figure 2A:
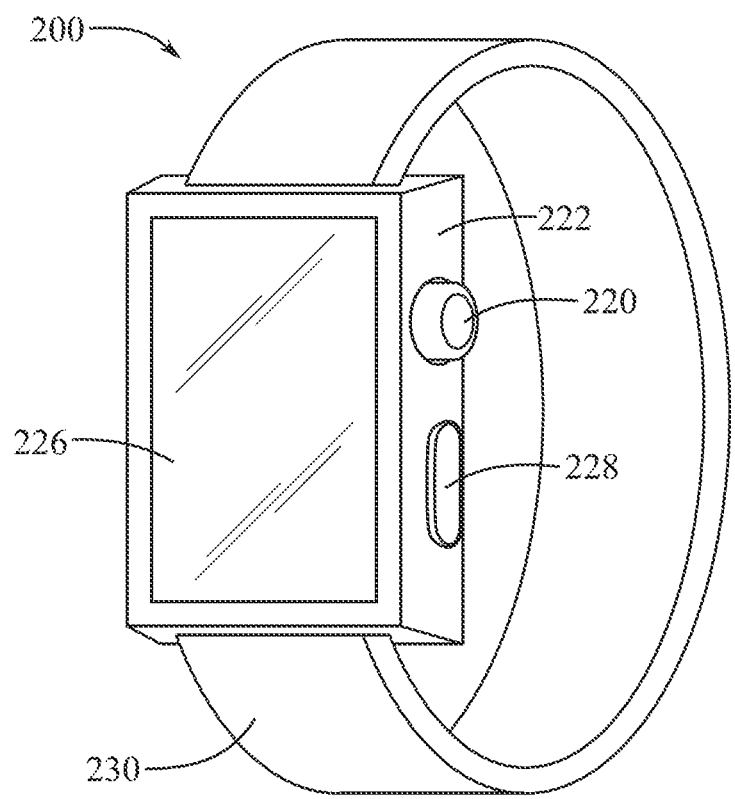
FIG. 2A shows a perspective view of a wearable electronic device.

FIG. 2A illustrates an example wearable electronic device 200 according to one embodiment of the present disclosure. The wearable electronic device 200 can be substantially similar to, and can include some or all of the features of the electronic device 100 discussed above. In some examples, the wearable electronic device 200 is a smart watch capable of time keeping, health monitoring device, navigation, communication, etc.

The wearable electronic device 200 can include a housing 222 and a display 226 positioned within an opening formed in a top surface of the housing 222. Generally, the display 226 can be used to present visual output to the user. For example, the display 226 can be used to present or display a graphical user interface having one or more graphical elements. The electronic device 200 can also include one or more user input devices, including, for example, a touch screen integrated with the display 226, a button 228 (or other input mechanism) positioned on a surface of the housing 222, and an input device 220 positioned on a side surface of the housing 222. The input device 220 can be substantially similar to, and can include some or all of the features of the input device 120 discussed above, and the input devices 320, 420 discussed below. As discussed in greater detail below, the input device 220 includes a dial or knob for receiving rotational and translational input from the user and is equipped with a touch-sensitive interface having multiple electrical paths for receiving capacitive touch input from a user capable of providing directional detection and signals that can be utilized to enhance control and operation of the electronic device.

In some examples, the wearable device 200 includes a processor coupled with or in communication with a memory, one or more communication interfaces, output devices such as displays and speakers, and one or more additional input devices such as buttons, dials, microphones, or touch-based interfaces. The communication interface(s) can provide electronic communications between the electronic device and any external communication network, device or platform, such as but not limited to wireless interfaces, Bluetooth interfaces, Near Field Communication (NFC) interfaces, infrared interfaces, Universal Serial Bus (USB) interfaces, Wi-Fi interfaces, Transmission Control Protocol/Internet Protocol (TCP/IP) interfaces, network communications interfaces, or other communication interface. The wearable electronic device 200 can include computer-readable instructions or software that is configured to be executed by the processor to perform various functions or operations. In some examples, the device 200 can be configured to provide information regarding time, health, event notifications, device status, and other information. The device 200 can also be externally connected to or communicating with separate devices and/or software executing on separate devices. In some examples, the device 200 can be configured to send and receive messages, video, and commands, in addition to other electronic communications.

In some examples, the display 226 is configured to output a graphical user interface that displays information about the electronic device 200, as well as other information that is stored in a memory of the electronic device 200. For example, the user interface can present information corresponding to one or more applications that are being executed on the electronic device 200. Such applications can include a time keeping application, an email application, a phone application, a calendaring application, a game application, and the like.

In some examples, and as will be discussed below, movement sensors can be used to determine movement or actuation information associated with the input device 220. The movement can be rotational movement, translational movement, angular movement, and so on. Further, touch sensors can be used to determine touch inputs on the input device 220. The touch inputs can be taps, presses, and swipes. Output representing movement or touch on the input device 220 can be used to manipulate graphics, images, icons, and/or other graphical elements of a user interface on the display 226 of the wearable electronic device 200.

In some examples, the button 228 or the input device 220 can be used to select, adjust or change various images that are output on the display 226. For example, if the display 226 of the electronic device 200 is used to display a time keeping application that simulates the face of a watch, the input device 220 can be used to adjust the position of the hands or index the digits that are displayed for the watch face simulation. In some examples, the input device 220 can be rotated to move a cursor or other type of selection mechanism from a first displayed location to a second displayed location in order to select an icon or move the selection mechanism between various icons that are output on the display 226. Likewise, the input device 220 can be pushed, pressed, touched, or otherwise actuated to provide another input to the device 200.

Although omitted from FIG. 2A for clarity, the wearable electronic device 200 can also include various additional components that assist in the overall operation of the device. For example, the wearable electronic device 200 can include one or more sensors, a microphone, a haptic actuator, a battery, a processor, a memory, and various other components. Further, the input device 220 and/or the button 228 can interact with one or more of the components listed to facilitate operation of the electronic device 200.

As shown in FIG. 2A, the wearable electronic device 200 can also include a band 230 to secure or attach the wearable electronic device 200 to a user. In the present example, the band 230 is attached to the housing 222 via a pin or flexible joint. In some examples, the band 230 is formed from two band straps that are attached to each other via a clasp to secure the device 200 to the wrist of a user. Other attachment mechanisms or components, including, for example, a strap, a lanyard, or other such attachment mechanism can also be used to attach the device 200 to a user.

In some embodiments, the wearable electronic device 200 can also include a joystick, controller, keyboard or other similar separate input mechanism. The input device 220 can be operatively coupled with the separate input mechanism. In some examples the input device 220 is used in conjunction with the separate input mechanism to provide certain inputs to the wearable electronic device 200. In some examples, the input device 220 eliminates the need for one or more separate input mechanisms. Additionally, the electronic device 200 can include one or more components that enable the wearable electronic device 200 to connect to the Internet and/or access one or more remote databases or storage devices.

Figure 2B:
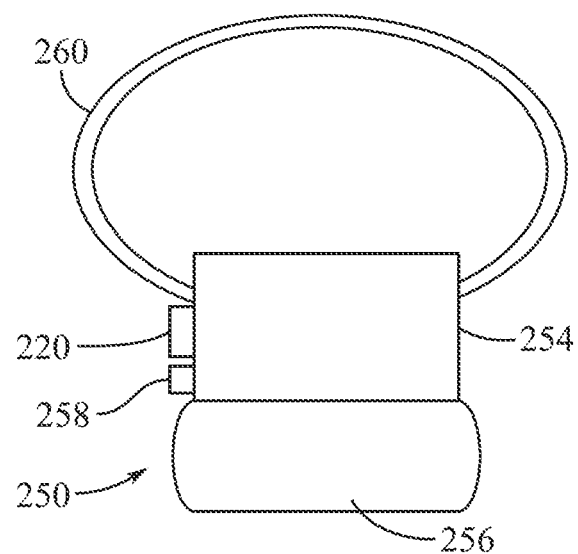
FIG. 2B shows a perspective view of a head-mounted display.

FIG. 2B illustrates a head-mounted display (HMD) 250. The HMD 250 can be substantially similar to, and can include some or all of the features of, the electronic device 100 and the wearable electronic device 200 discussed above. In some examples, HMD 250 can be used in virtual reality, mixed reality, augmented reality, augmented virtuality, or computer-generated reality. It will be understood that the term "HMD" or "head-mounted display" as used herein, also refers to and captures smart glasses. In other words, the disclosure as it relates to HMDs can be implemented to smart glasses in a similar manner. As illustrated, the HMD 250 can include a housing 254, a display or lens 256, a retaining element 260, an input device 220, and a sensor unit 258. However, it will be understood that the HMD 250 can include other components not shown in FIG. 2B.

The housing 254 of the HMD 250 can be a physical structure that incorporates, contains, or connects electrical components such as those discussed above with reference to FIG. 1. The HMD 250 can include a display 256 that can present images visible to the user or visible to others on an exterior of the HMD 250. In some examples, the display 256 can include a transparent or semi-transparent lens for the user to view the outside environment. In some examples, characteristics of the input device 220 and the sensor unit 258 can be displayed to the user on the display 256. For example, the display 256 can present a dynamic image representing data received by the sensor unit 258 and/or the input device 220. The display 256 can present a visual indicator based on a location of a user's finger relative to the touch-sensitive region. For example, the display can present a dynamic image representing a location of a user's finger or hand relative to the input device 220. This dynamic image can aid the user in locating the input device 220 or orienting the user's touch and motion inputs on the input device 220.

The sensor unit 258 can detect or determine one or more aspects of the physical environment of the HMD 250. The sensor unit 258 can include one or more of a camera, a microphone, an infrared receiver, a global positioning system unit, a gyroscopic sensor, an accelerometer, a pressure sensor, a capacitive sensor, a biometric sensor, a magnetometer, a radar unit, a LIDAR unit, an ultrasound unit, a temperature sensor, or any other sensor capable of detecting or determining one or more aspects or conditions of the environment of the HMD 250. In some examples, the sensor unit 258 is a camera capable of detecting a hand of the user and determine that the hand is travelling toward input device 220. Further, the input device 220 can be capable of performing a hover detection of the user's hand. Thus, a user's upcoming use of the input device 220 can be predicted using the sensor unit 258 and/or a hover detect feature of the input device 220.

In some examples, input provided to the input device 220 can be used to determine that a user is about to use the HMD 250. The input provided to the input device 220 can prompt the HMD 250 to change modes or activity levels of the HMD 250.

In some examples, the input device 220 positioned on the HMD 250 can be used to determine one or more physical characteristics of the user wearing the HMD 250. For example, a user can place a finger onto the input device 220 to enable a physical or health determination of the user. In some examples, the HMD 250 is able to perform an electrocardiogram or other health measurement.

The input device 220 can be used to perform a variety of actions on the HMD 250. In some specific examples, rotation of the input device 220 can cause content displayed on the display 256 to zoom in or out depending on the direction of rotation. A finger swipe across the input device 220 can scroll displayed content up or down or can also be used to move among or between displayed pages. Input provided at the input device 220 can adjust a variety of setting on the HMD 250, such as volume, video speed/position, brightness, etc., as detailed further below with reference to FIGS. 5A-8B.

In some examples, the HMD 250 can be operably coupled with a controller for providing input to the HMD 250. The input device 220 can be used in conjunction with the controller, or in lieu of the controller. In some examples, a command corresponding to an input on the input device 220 changes based on an application or setting of the HMD 250. For instance, when the HMD 250 is in a first mode, an input performed on the input device 220 is interpreted as a first command, and when the HMD 250 is in a second mode, the input performed on the input device 220 is interpreted as a second, different command.

In some examples, the input device 220 protrudes or is proud of the housing 254 of the HMD. In other examples, the input device 220 is flush with the housing 254. In some examples, the input device 220 is operatively coupled to an optical or magnetic encoder used to measure rotation or translation of the dial or knob. Further details of an input device 220 are provided below with reference to FIGS. 3A and 3B.

Figure 3A:
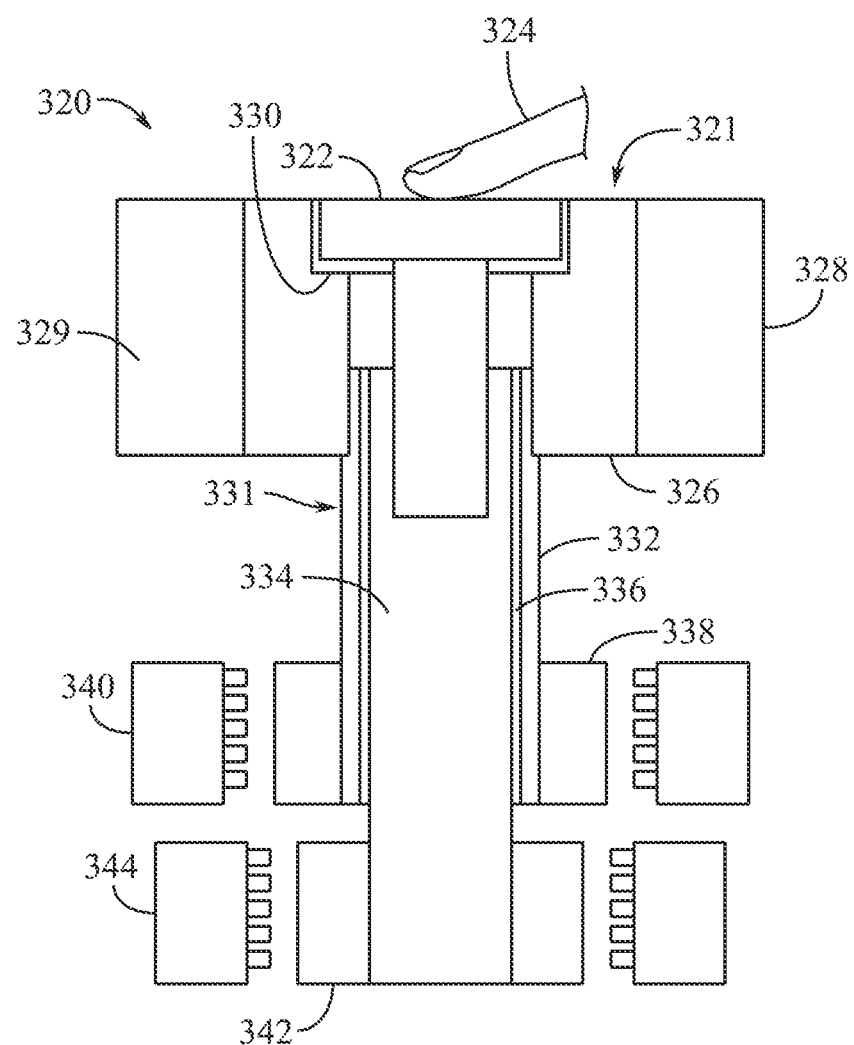
FIG. 3A shows a side view of an input device.

FIG. 3A illustrates an input device 320. The input device 320 can be substantially similar to, and can include some or all of the feature of input devices 120 and 220 as described above, and input device 420 as described below. The input device 320 can be operably coupled with an electronic device, such as the electronic device 100, the wearable electronic device 200, and the HMD 250 discussed above. The input device 320 can include a cap or crown 328 defining an input surface 321. The input surface 321 can include a touch-sensitive interface. The crown 328 can be manipulated in a variety of directions. In some examples, this movement can include translation in one or more directions, rotation in both clockwise and counter-clockwise directions, tilt, and so on. The crown 328 can be moved by a user exerting a force on the crown 328, for example, with their finger. Moving the crown 328 can be used to generate a predetermined input signal corresponding to the motion.

The crown 328 can include an outer region 329, at least partially surrounding an inner region 326. In some examples, the outer region 329 in the inner region 326 of the crown 328 is a unitary component. In some examples, the outer region 329 and the inner region 326 are electrically coupled. In some examples, the outer region 329 and the inner region 326 are not electrically coupled. For instance, the outer region 329 can include a non-conductive material.

Figure 3B:
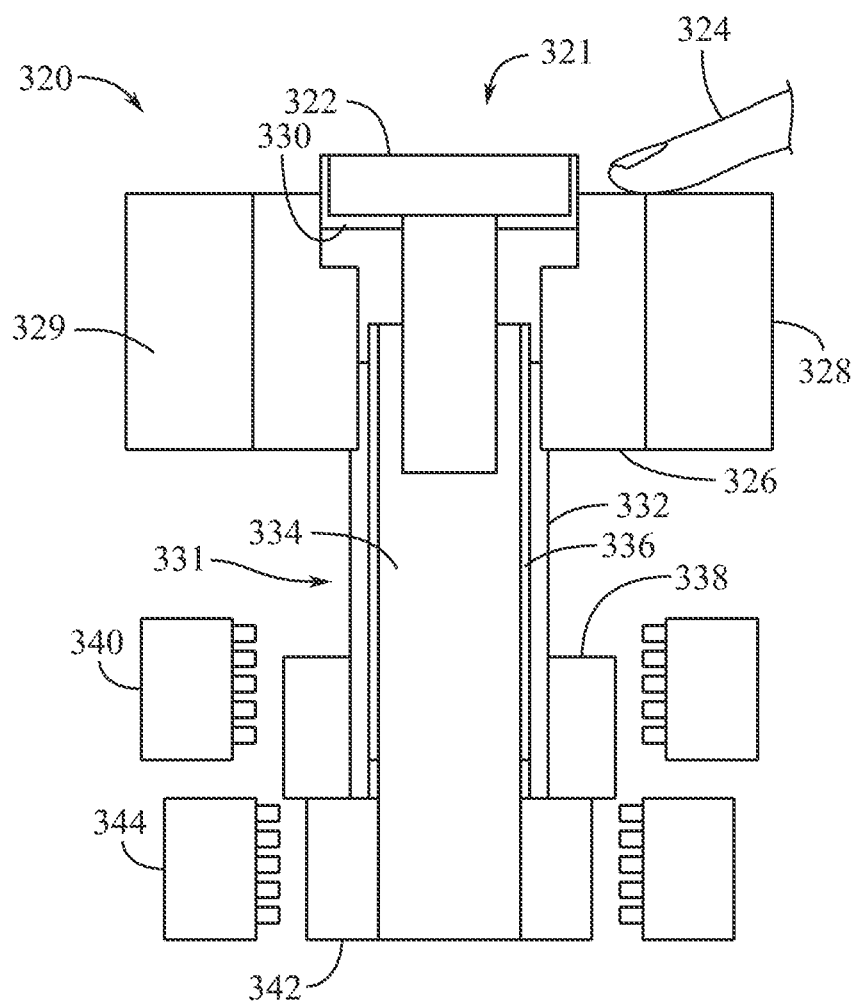
FIG. 3B shows a side view of the input device of FIG. 3A in a depressed state.

The crown 328 can include a central region 322 that is at least partially surrounded by the inner region 326. In some examples, the central region 322 can be electrically isolated from the inner region 326. For example, an insulator 330 can be positioned between the central region 322 and the inner region 326. As shown in FIG. 3B, in some examples, the inner region 326 is translatable relative to the central region 322. In some examples, the inner region 326 is rotatable relative to the central region 322. This decoupled structure between the central region 322, the inner region 326, and the outer region 329 can add increased functionality and capability to the input device 320. More particularly, the ability to independently select one or more of the central region 322, the inner region 326, and/or the outer region 329 via translation, rotation, or capacitive touch multiplies the number of input signals that can be provided by a single input device 320 in a relatively small footprint.

The input surface 321 of the input device can be defined by portions of the outer region 329, the inner region 326, and/or the central region 322. The input surface 321 can at least partially define an external surface of an electronic device on which the input device 320 is housed. In other words, the input surface 321 can be accessible to a user. As shown, a user's finger 324 can touch the input surface 321 (i.e., provide capacitive input). The input surface 321 can define a touch-sensitive interface at least partially defining multiple electrical paths capable of transmitting signals through the input device 320. For example, a touch by a user on one or more of the electrical paths can be used to generate a predetermined signal corresponding to the received touch input. Further, a sequence of touches along predetermined electrical paths can correspond to certain touch-gesture inputs.

The input device 320 can include a stem 331 extending from the crown 328. In some examples, the outer region 329, the inner region 326, and the central region 322 can be mechanically or physically coupled to the stem 331. Specifically, the stem 331 can include an inner cylinder 334 and an outer cylinder 332 that is electrically isolated from the inner cylinder 334 using an insulator 336. The outer cylinder 332 can include a notch or protrusion that engages with the inner region 326 such that a downward force exerted upon the inner region 326 and/or the outer region 329 transfers to the outer cylinder 332, causing downward motion of the inner region 326 and the outer cylinder 332. The outer cylinder 332 can include components 338 that are electromechanically coupled with brushes 340. Thus, the inner region 326 and/or the outer region 329 can be in electrical communication with the outer cylinder 332 and the components 338 such that a capacitive touch by the user's finger 324 on the inner region 326 or the outer region 329 is transferred to the outer cylinder 332, then to the components 338, and ultimately to the brushes 340, establishing a first electrical path.

In some examples, the central region 322 can be electrically and mechanically coupled with the inner cylinder 334 of the stem 331. The mechanical connection between the central region 322 and the inner cylinder 334 allows a force exerted on the central region 322 to be transferred to the inner cylinder 334. The inner cylinder 332 can include signal contacts or components 342 that are electromagnetically coupled to brushes 344. Thus, a capacitive touch by a finger 324 on the central region 322 can be transferred to the inner cylinder 334, then to the components 342, and ultimately to the brushes 344, establishing a second electrical path. It will be understood that extrapolating the described configuration, more than two electrical paths are possible. The multiple electrical paths of the input device 320 can be used to mitigate false signals produced by water or moisture on the input surface. The distinct electrical paths can identify different capacitances between moisture, a finger, and a ground capacitance, and can accordingly disregard input determined to be produced by a moisture event.

In some examples, the bottom portion of the stem 331 is the point of contact between the input device 320 and the electronic device which carries the input device 320. The bottom of the stem 331 can be the only point of physical contact with the electronic device (i.e., the crown 328 does not, in some examples, contact the housing or any other portion of the electronic device).

The stem 331 can be made with a compliant or flexible material. In some examples, the stem 331 includes a spring. The stem 331 can include strain gauges to determine the movement of the stem 331. In some examples, the brushes 340, 344 can have springs to deflect or depress in response to a change in the angle of the stem 331 relative to the brushes 340, 344, as detailed below with reference to FIGS. 7A and 7B.

In some examples, the input device 320 can include touch pixels, electrocardiogram (ECG) sensors, and other electrical inputs. In some examples, the input device 320 includes at least one of an optical encoder and a magnetic encoder. Signals can be detected using optical, conductive, magnetic, or mechanical encoders, individually or in any combination.

FIG. 3B illustrates an example configuration of the input device 320 in which the outer region 329 and the inner region 326 have been pushed down relative to the central region 322. By exerting a downward force on the inner region 326, the outer cylinder 332 can travel downward due to the mechanical link between the inner region 326 and the outer cylinder 332. In some examples, the outer cylinder 332 is restricted from travelling a distance that would cause interference between the components 338 of the first electrical path and the components 342 of the second electrical path.

In some examples, the input device 320 can be translationally fixed. An attempted or intended translation of the input device 320 (e.g., push or press) can be determined using one or more sensors positioned on the input surface 321. For example, the capacitive sensors and/or force pressure sensors can be used to detect an intended translation of the input device 320. Further details of example features of the input device are provided below with reference to FIGS. 4A and 4B.

Figure 4A:
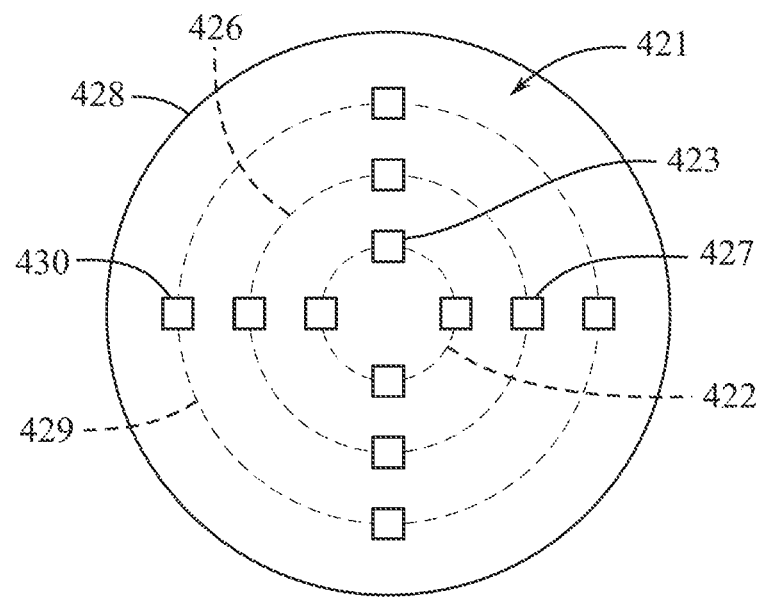
FIG. 4A shows a schematic top view of the input device of FIG. 3A.
Figure 4B:
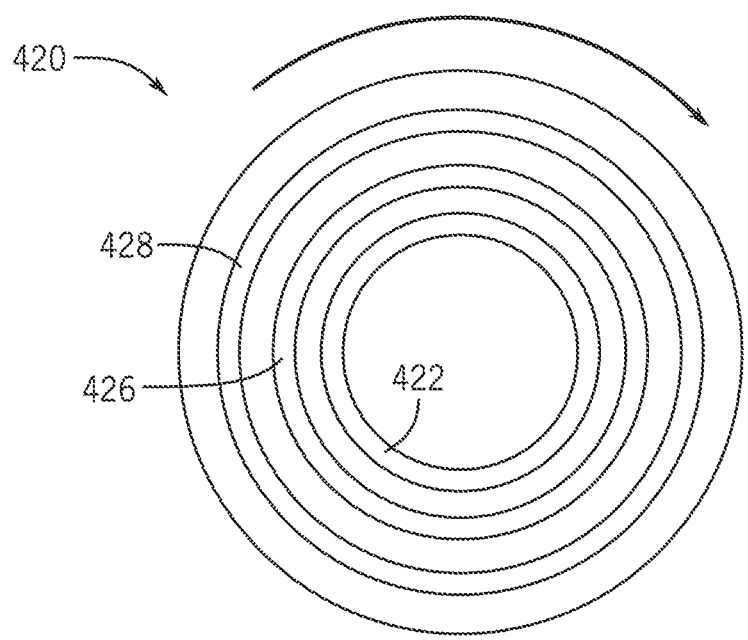
FIG. 4B shows a schematic bottom view of the input device of FIG. 4A.

FIG. 4A illustrates a schematic top view of a crown 428. FIG. 4B illustrates a schematic bottom view of the crown 428. The crown 428 can be substantially similar to the crown 328 described above. In some examples, the input device 420 defines an input surface 421. The input surface 421 can include a plurality of conductive pads or electrodes that at least partially define a series of distinct electrical paths, as shown in FIG. 4B. For example, the crown 428 can include a first set of electrodes 430 forming a first electrical path 429, a second set of electrodes 427 forming a second electrical path 426, and a third set of electrodes 423 forming a third electrical path 422. The electrical paths 422, 426, and 429 can be electrically isolated from one another such that a processor electrically coupled to each of the electrical paths can detect whether the signal is coming from the first set of electrodes 430, the second set of electrodes 427, the third set of electrodes 423, or combinations thereof.

In some examples, a swipe can be detected by registering a series of capacitive touches that occur in rapid succession among the first set of electrodes 430, the second set of electrodes 427, or the third set of electrodes 423. In a specific example, a swipe can be determined by detecting, in order, signals at the first electrical path 429, the second electrical path 426, the third electrical path 422, the second electrical path 426, and the first electrical path 429. Further, depending on which electrodes are activated, the direction, speed, and/or magnitude of the swipe can be determined (e.g., swipe up, down, left, right, diagonally, etc.). Further, non-linear gestures or swipes can be detected by the crown 428. For example, a circular gesture can be detected in response to detecting a succession of touches on the electrodes positioned in a circular configuration (e.g., a counter-clockwise circular gesture can be determined by detecting touches along the left, bottom, right, and top electrodes 430 within a predetermined amount of time). Alternatively, an array of electrodes can be positioned on the exterior of the crown, which when touched, can signal a desired rotation of the crown. A swiping motion as described above is illustrated in FIG. 5A.

In some examples, the crown 428 is rotationally fixed. An attempted or intended rotation of the crown 428 can be determined using one or more sensors positioned on the crown. For example, the outer perimeter or sidewall of the crown 428 can include conductive pads or electrodes that can be used detect an intended rotation of the crown 428. A determination that the user is attempting to rotate the crown 428 can be made upon detecting a first touch at a first location on the perimeter of the crown 428 and subsequently detecting a second touch at a second location on the crown 428. In some examples, the first touch and the second touch occurring within a predetermined amount of time results in a determination of intended rotation. In some examples, the first touch and the second touch occurring without the user removing their finger results in a determination of intended rotation.

Figure 5A:
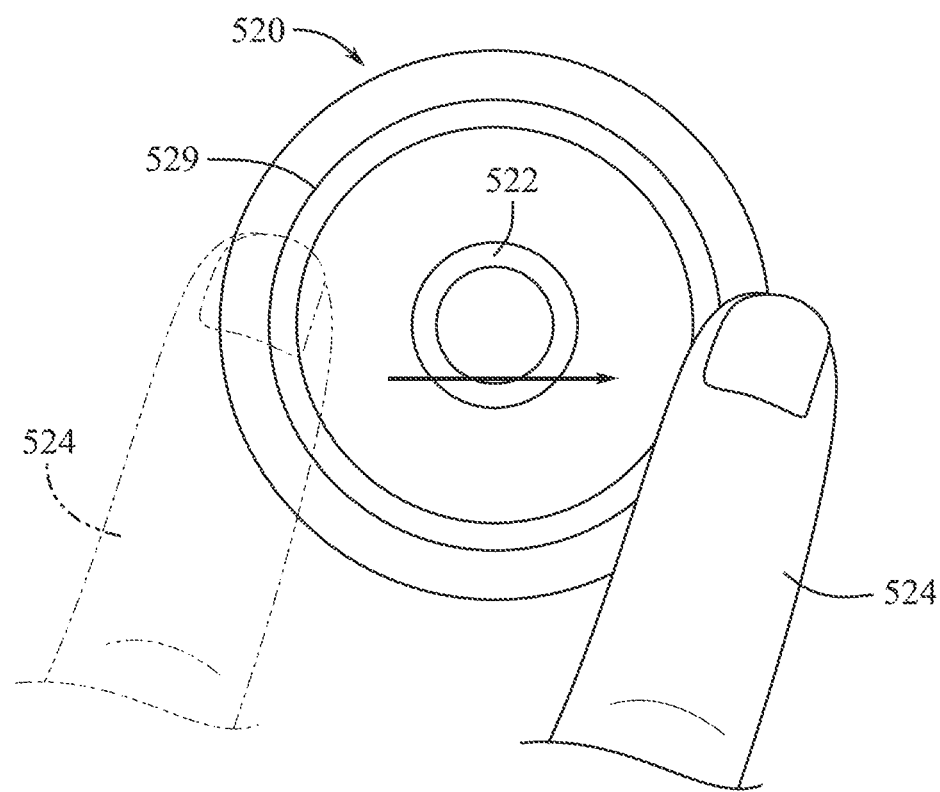
FIG. 5A shows a top view of an operation of an input device.

FIG. 5A shows a top view of an operation of an input device 520. The input device 520 can be substantially similar to, including some or all of the features of, the input devices 120, 220, 320, and 420, as described herein. The operation shown in FIG. 5A represents a specific use case of a user's finger 524 swiping across the input member 520. As the user's finger 524 passes across the input member 520, one or more electrical paths 529, 522 can detect the presence and direction of the user's finger 524 on the input device 520. The electrical paths 529 and 522 can determine that the user's finger 524 is swiping in a generally straight line from left to right, as oriented in FIG. 5A. It will be understood that the input device 520, in connection with a processor, can detect swipes in any direction, and can further detect non-linear patterns of the finger 524 on the input device 520 (e.g., circular swipes potentially indicating an intended rotation of the input device 520). Furthermore, the input device 520 can detect the velocity of the swipes to add further fidelity to the response signal generated by the input device. An exemplary response to an input detected by the input device 520 is provided below with reference to FIG. 5B.

Figure 5B:
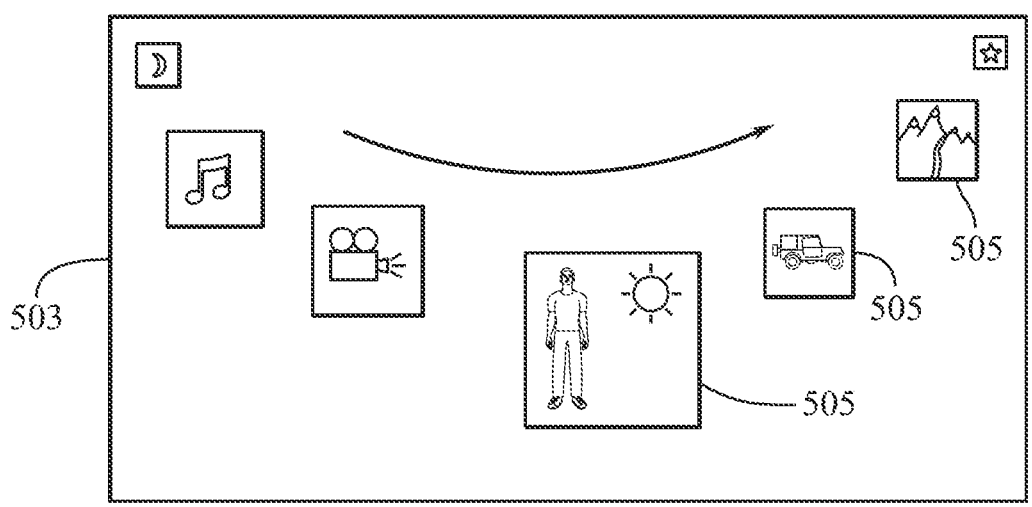
FIG. 5B shows a user interface responsive to the operation of FIG. 5A.
Figure 5C:
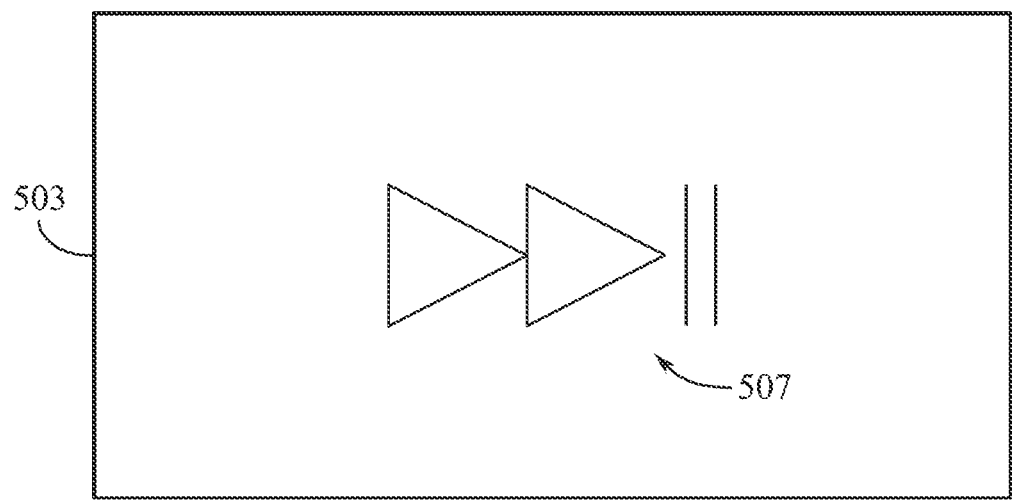
FIG. 5C shows a user interface responsive to the operation of FIG. 5A.

FIG. 5B shows a user interface 503 responsive to the operation of FIG. 5A. The user interface 503 can, in one example, be a display of an HMD. In some examples, swiping the finger 524 across the input device 520 can generate a signal that is interpreted by a processor to cause a display to scroll through, or to move among or between, displayed pages or applications 505. The direction of the displayed applications 505 can correspond to the direction of the swipe on the input device 520. For example, in FIG. 5A, the user's finger 524 swipes from left to right. Thus, the movement of the applications 505 displayed on the user interface 503 can likewise move from left to right, as viewed by the user. In other words, the movement of the applications 505 can mirror the detected movement of the user's finger 524 on the input device 520. The speed in which the applications 505 move can correspond to a detected velocity of the user's finger 524 across the surface of the input device 520. Manipulation of the applications 505 can occur in any number of directions, sequences, or orientations. Additional system functions can also be controlled via the described input device 520, as detailed below with reference to FIG. 5C FIG. 5C shows a command indicator 507 displayed on the user interface 503. The command indicator 507 can be responsive to the swipe of FIG. 5A. Input provided at the input device 520 can adjust a variety of settings on an HMD, such as volume, video speed/position, brightness, track selection, etc. FIG. 5C illustrates a specific use case in which the swipe from left to right, as shown in FIG. 5A, corresponds to a command to fast forward or skip forward in a media application being viewed or listened to by the user. In some examples, the user can program personalized movements on the input device 520 to correspond to certain commands. In this manner, when a user desires to skip or fast forward a media application being viewed by the user, the user can controllably swipe the input device to selectively skip or fast forward the media application, with corresponding functional indicators 507 being presented to the user on the user interface 503, or otherwise impact the computer-generated reality. In addition to direct touch detection, the input device can have added functionality, as detailed below with reference to FIGS. 6A-6D.

Figure 6A:
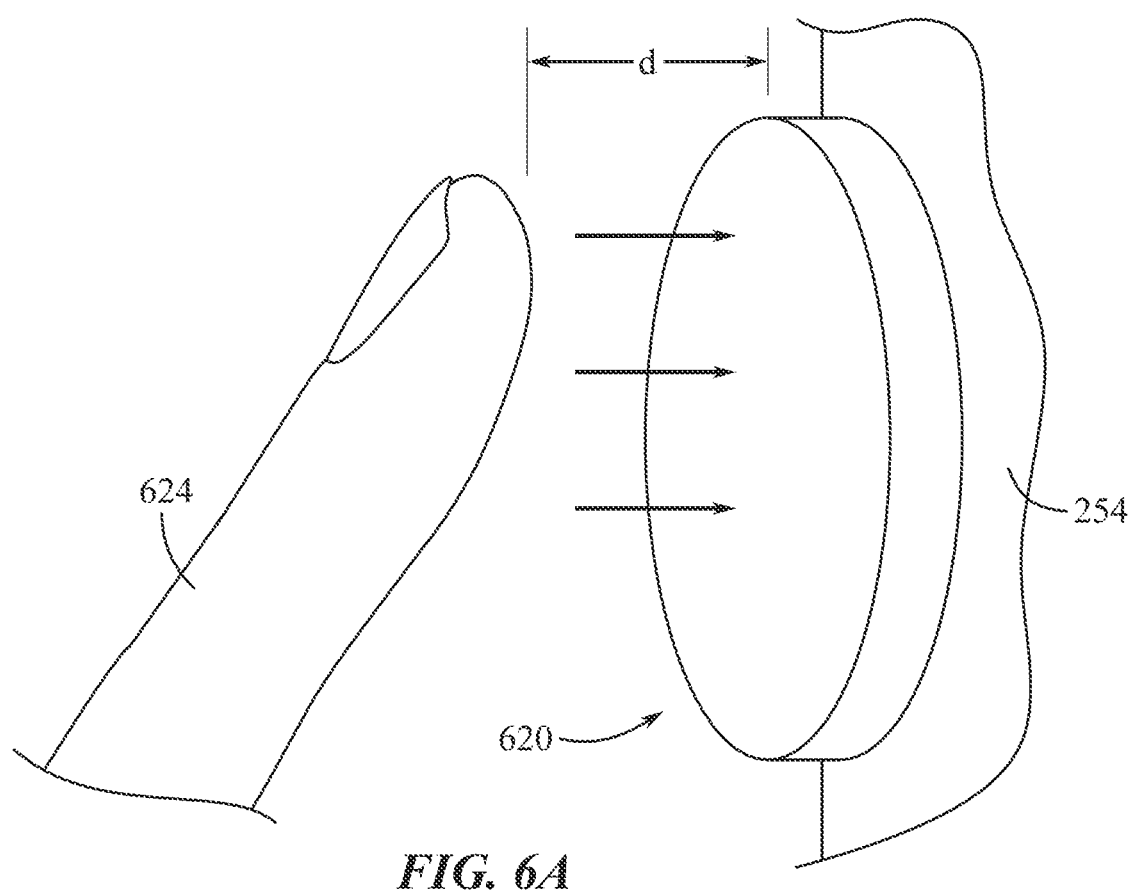
FIG. 6A shows a perspective view of an operation of an input device.
Figure 6B:
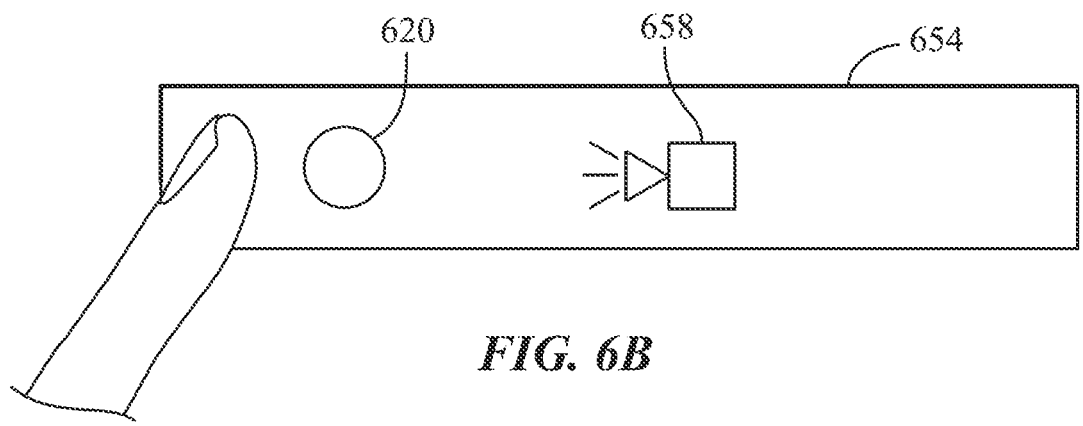
FIG. 6B shows a side view of an operation of a head-mounted display.

FIG. 6A shows a perspective view of an operation of an input device 620. The input device 620 can be substantially similar to, including some or all of the features of, the input devices 120, 220, 320, 420, and 520 as described herein. The input device 620 can be positioned on an HMD housing 254 or any other electronic device. In some examples, a proximity of a finger 624 to the surface of the input member 620 can be determined and can initiate functionalities of the HMD. This capability can be referred to as hover or proximity detection. According to one example, when a finger 624 or other body part is moved to with a distance "d" of the input member 620, the presence of the finger is detected and can initiate a functionality of the HMD. Referring to FIG. 6B, the proximity of the finger 624 can be determined by a change in the electric field at the input member 620 due to the proximity of the finger 624, and/or by one or more sensors 658 present on the housing 654 of the HMD. In some examples the sensor 658 is an external cameras capable of monitoring the position of the user's finger 624 in relation to the input device 620.

Figure 6C:
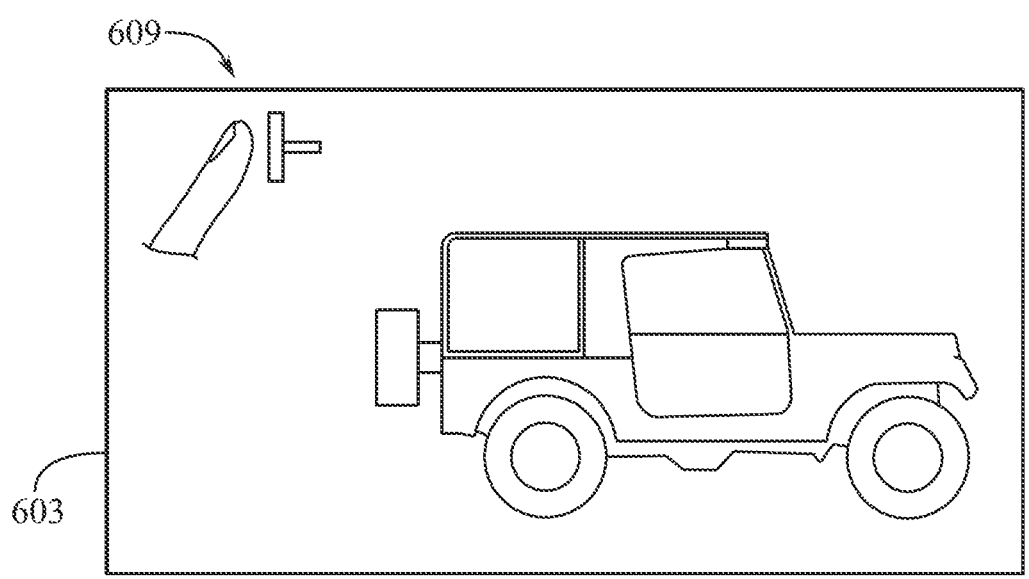
FIG. 6C shows a user interface responsive to the operation of FIG. 6B.

FIG. 6C shows a user interface 603 responsive to the operation of FIGS. 6A and 6B. The user interface 603 can be a display of an HMD. In response to detecting a proximity of the user's finger to the input device (i.e., hover or proximity detection), a graphical icon 609 can appear on the user interface 603. The graphical icon 609 can represent a positional relationship between the user's finger and the input device 620. In some examples, an actual image captured by the external camera 658 can be displayed on the user interface 603 showing the user's hand approaching the input device 620. The graphical icon 609 notify a user that their finger is near the input device and can assist the user in locating the input device 620 before the finger actually engages the input device. In some examples, audio indicators can also correspond to a proximity of the user's finger (e.g., a sound increases in volume as the user's finger draws closer to the input device 620). In some examples, hover or proximity detection of the user's finger can prompt an action on the user interface 603. For example, upon determining that the user's finger is hovering at or near the input device 620, active media can be paused.

Figure 6D:
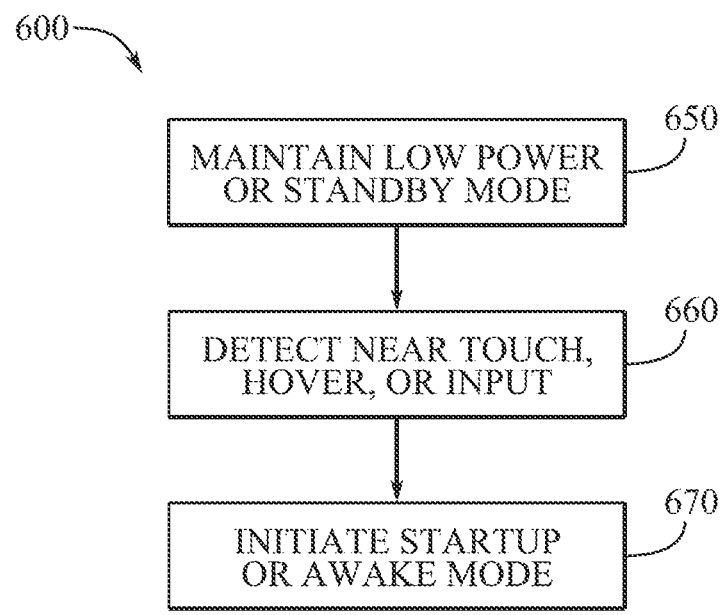
FIG. 6D shows a process flow diagram.
Figure 7A:
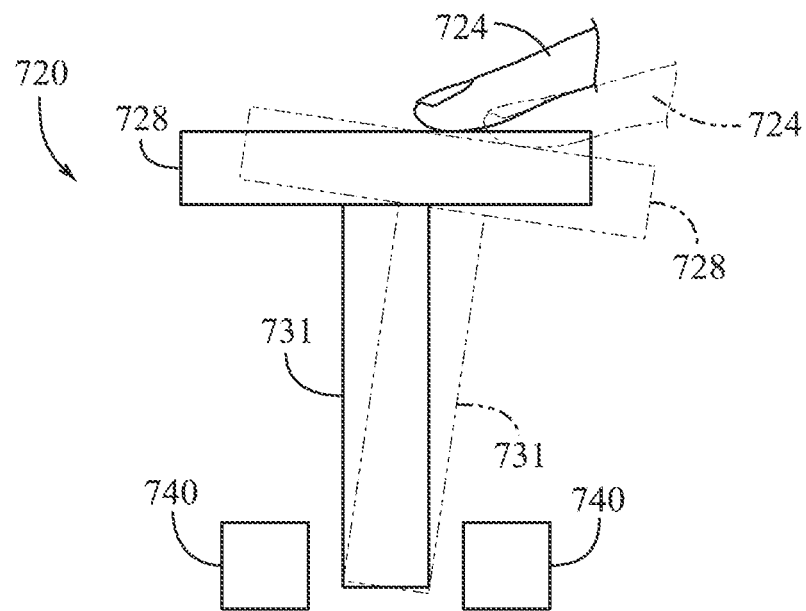
FIG. 7A shows a side view of an operation of an input member.

FIG. 6D shows an example process flow diagram 600 of the hover detection feature. At step 650, an electronic device, such as an HMD, maintains a low power or standby mode. The HMD can assume the low power or standby mode in order to save battery life and can occur as a natural result of non-use or can result from the user inputting a command to enter the low power or standby mode. In some instances, removal of the HMD can place the device in a low power or standby mode. At step 660, the HMD can detect a near touch/hover or input at the input device using the procedures described above. This near touch/hover detection can occur when a user grasps the HMD to move it or to again place the HMD on their head for further use. At step 670, the HMD can, in response to the detected near touch/hover or input at step 660, can initiate a startup or enters an awake mode. The process 600 can conserve power and can also predict an upcoming use of the HMD and can initiate procedures to prepare for the predicted use. This allows the HMD to start up and be at or near operation mode when placed on the user's head, thereby enhancing the user experience. Further functionalities of the input member are provided below with reference to FIGS. 7A and 7B. FIG. 7A shows a side view of an operation of an input member 720. The input device 720 can be substantially similar to, including some or all of the features of, the input devices 120, 220, 320, 420, 520, and 620 as described herein. The input member 720 can be configured to operate as a joystick. That is, the crown 728 and stem 731 of the input device 720 can pivot or tilt in multiple directions and at various angles in response to a force applied by a user's finger 724. Sensors 740, such as a pivot detection sensor, can detect and report the angle and direction of the input device 720 via signals that are interpreted by a processor and graphically represented on a user interface.

Figure 7B:
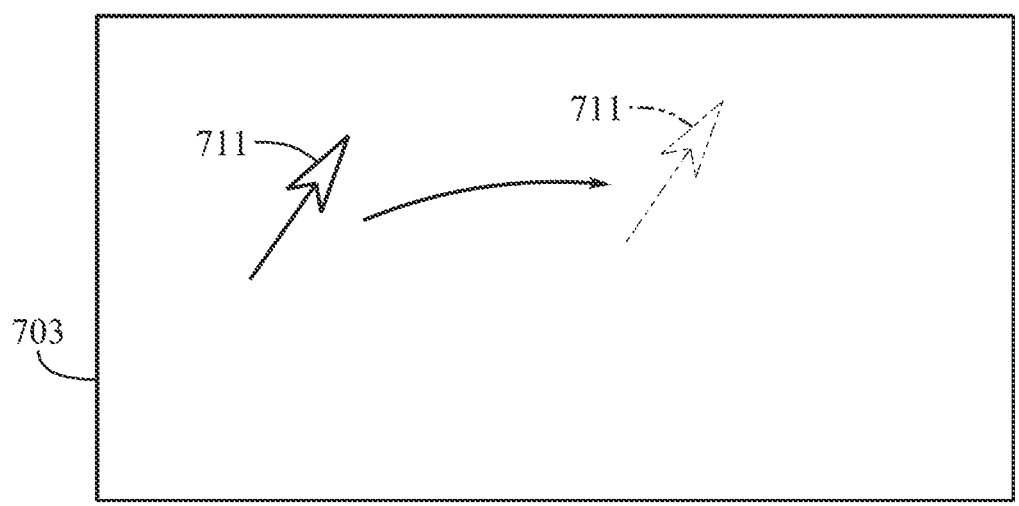
FIG. 7B shows a user interface responsive to the operation of FIG. 7A.

FIG. 7B shows a user interface 703 responsive to the detected tilt movement of the input device 720, as shown in FIG. 7A. The user interface 703 can be a display of an HMD, according to one example. In a specific use case, a graphical icon, such as a cursor 711, can be controlled by the detected motion of the input device 720. For example, FIG. 7A depicts the input device being tilted to the right, which, as shown in FIG. 7B, can cause the cursor 711 to move to the right on the user interface 703. Additionally, the angle at which the input device is tilted can provide additional input and control of the user interface 703. For example, larger angle or greater tilt of the input device 720 can cause an increase in the speed of the cursor 711 as it moves across the screen. Additional exemplary combinations and functionalities of the input device are provided below with reference to FIGS. 8A and 8B.

Figure 8A:
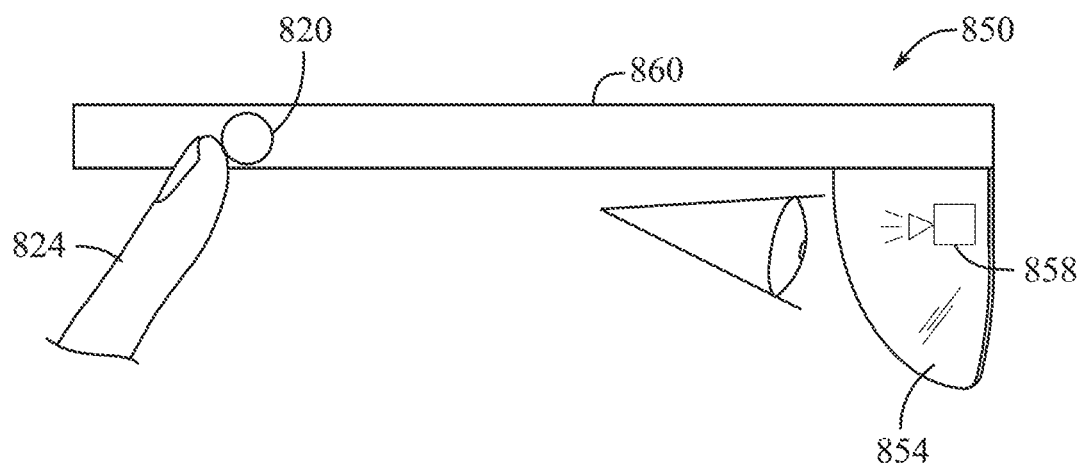
FIG. 8A shows a side view of an operation of a head-mounted display.

FIG. 8A shows a side view of an operation of an HMD 850. Again, as used herein, the term HMD can include smart glasses. The HMD 850 can include a frame 860 and a user interface 854. An input device 820 and camera 858 can be positioned on the HMD 850. The camera 858 can be used to track a gaze of the user. The input device 820 can be substantially similar to, including some or all of the features of, the input devices 120, 220, 320, 420, 520, 620, and 720 as described herein. In some examples, the input device 820 can be used in combination with the gaze tracking camera 858 to provide input, command, and control to the HMD 850.

Figure 8B:
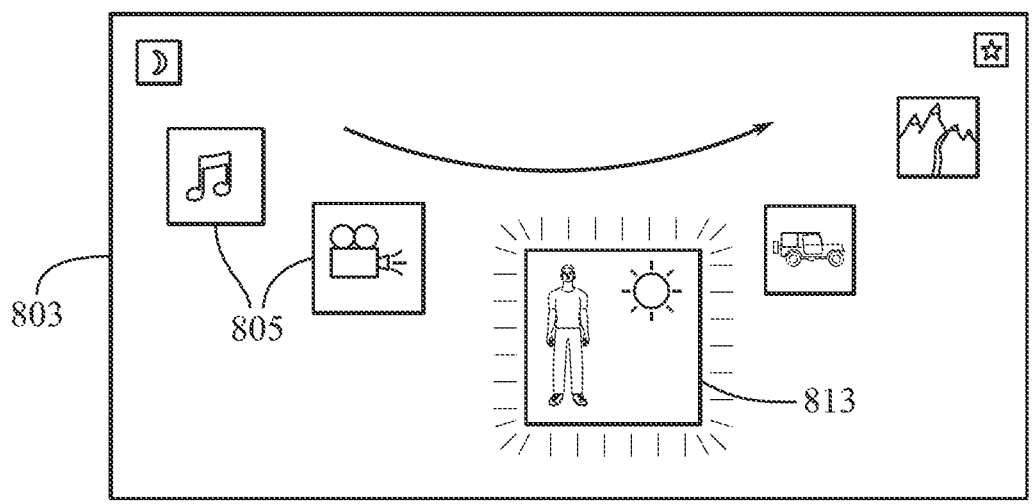
FIG. 8B shows a user interface responsive to the operation of FIG. 8A.

FIG. 8B shows a specific use case of a user interface 803 of the HMD 850 of FIG. 8A. As shown in FIG. 8B, the user interface 803 can include multiple graphical icons or applications 805. The user interface 803 can be controlled by the input device 820 and the gaze tracking camera 858, individually or in combination. For example, input by a user's finger 824 at the input device 820 can cause the applications 805 to move or change. The input at the input device 820 can be a swipe, a rotation, a tilt, or combinations thereof, as discusses above. A second input can then be provided by determining the gaze of the user. For example, the gaze tracking camera 858 can determine that the user is looking at, and or visually tracking, a specific icon 813 and can perform a function based on that determination. For instance, the application corresponding to icon 813 can be selected and/or opened if the gaze tracking camera 858 determines that a user is focused on a specific icon 813 for a pre-determined period of time while the input device 820 is engaged. In this manner, the user interface 803 can be interacted with using a combination of the input device 820 and gaze tracking camera 858. It will be understood that additional controllers can likewise work in concert with the input device 820 to provide input to the HMD 850.

Using the systems, methods, and processes discussed above, a vision system of a wearable device can have enhanced user interaction and can improve the user experience.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment includes a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A head-mounted display (HMD) comprising:
a housing;
a display attached to the housing; and
a tactile input disposed on the HMD, the tactile input comprising a touch-sensitive region defining a central region and an outer region;
wherein:
translation of the outer region relative to the central region produces a first input signal corresponding to a press on the outer region; and
rotation of the outer region produces a second input signal; and
a touch input provided at the central region produces a third input signal.

2. The HMD of claim 1, wherein:
the touch-sensitive region comprises:
a first electrical path; and
a second electrical path, isolated from the first electrical path; and
the tactile input comprises:
a cap configured to rotate and translate relative to the housing, the touch-sensitive region positioned on the cap;
a stem extending from the cap through an opening defined by the housing, the stem at least partially defining the first electrical path and the second electrical path; and
a non-conductive material positioned between the first electrical path and the second electrical path.

3. The HMD of claim 2, wherein:
a first end of the stem is attached to the cap; and
a second, opposite end of the stem is attached to a component within the housing.

4. The HMD of claim 2, wherein the touch-sensitive region comprises:

a first electrode electrically connected to the first electrical path; and
a second electrode, electrically isolated from the first electrode and electrically connected to the second electrical path.

5. The HMD of claim 4, further comprising:
a processor electrically connected to the first electrical path and the second electrical path;
wherein the processor:
receives a first finger detection signal from the first electrode via the first electrical path;
receives a second finger detection signal from the second electrode via the second electrical path; and
determines a translation of a finger across the touch-sensitive region based at least in part on the first finger detection signal and the second finger detection signal.

6. The HMD of claim 5, wherein the processor modifies an output of the display in response to the determined translation.

7. The HMD of claim 1, further comprising a proximity camera disposed on the housing and directed to the touch-sensitive region;
wherein the display presents a visual indicator based on a location of a user's finger relative to the touch-sensitive region detected by the proximity camera.

8. The HMD of claim 2, wherein the stem defines an axis, the cap rotatable about the axis and translatable in a direction that is substantially parallel to the axis.

9. The HMD of claim 8, wherein the axis is pivotable relative to the housing; and
further comprising a pivot detection sensor disposed adjacent to the stem.

10. The HMD of claim 1, further comprising a gaze camera disposed adjacent to the display.

11. A capacitive input member, comprising:
a crown defining an outer region electrically connected to a first electrical path and a central region electrically connected to a second electrical path, the central region electrically isolated from the outer region;
a first electrode electrically connected to the first electrical path;
a second electrode electrically isolated from the first electrode, and electrically connected to the second electrical path;
a shaft physically and electrically connected with the crown, the shaft having a longitudinal axis; and
a signal output sensor electromagnetically connected to the shaft, the shaft configured to transfer electrical and physical inputs from the crown to the signal output sensor;
wherein the outer region is movable parallel to the longitudinal axis relative to the central region.

12. The capacitive input member of claim 11, wherein:
the crown is rotatable about the axis.

13. The capacitive input member of claim 11, wherein the axis is pivotable relative to the signal output sensor.

14. The capacitive input member of claim 11, further comprising an array of perimeter electrodes disposed on a perimeter of the outer region.

15. A wearable device comprising:
a housing;
a display carried by the housing;
a processor disposed in the housing and electrically connected to the display; and a capacitive sensor carried by the housing and electrically connected to the processor, the capacitive sensor comprising:
  a movable outer surface comprising an outer region and a central region;
  a first conductive path extending from the outer region of the movable outer surface;
  a second conductive path extending from the central region of the movable outer surface; and
  a non-conductive insulator electrically isolating the first conductive path from the second conductive path;
  wherein the outer region is translatable relative to the central region and the housing.

16. The wearable device of claim 15, further comprising:
a first electrode disposed on the movable outer surface and electrically connected to the first conductive path; and
a second electrode disposed on the movable outer surface electrically isolated from the first electrode, and electrically connected to the second conductive path;
wherein the processor:
  receives a first finger detection signal from the first electrode via the first electrical path;
  receives a second finger detection signal from the second electrode via the second electrical path; and
  determines a translation of a finger across a touch-sensitive region based at least in part on the first finger detection signal and the second finger detection signal.

17. The wearable device of claim 16, wherein the processor modifies an output of the display in response to the determined translation.

18. The wearable device of claim 15, further comprising a proximity sensor connected to the housing, the proximity sensor configured to detect a proximity of a user's hand relative to the capacitive sensor.

19. The wearable device of claim 18, wherein the proximity sensor comprises a camera.

* * * * *